Aug. 3, 1965 P. PRESUNKA 3,198,543
VEHICLE PASSENGER'S PROTECTION DEVICE
Filed March 29, 1962 5 Sheets-Sheet 1
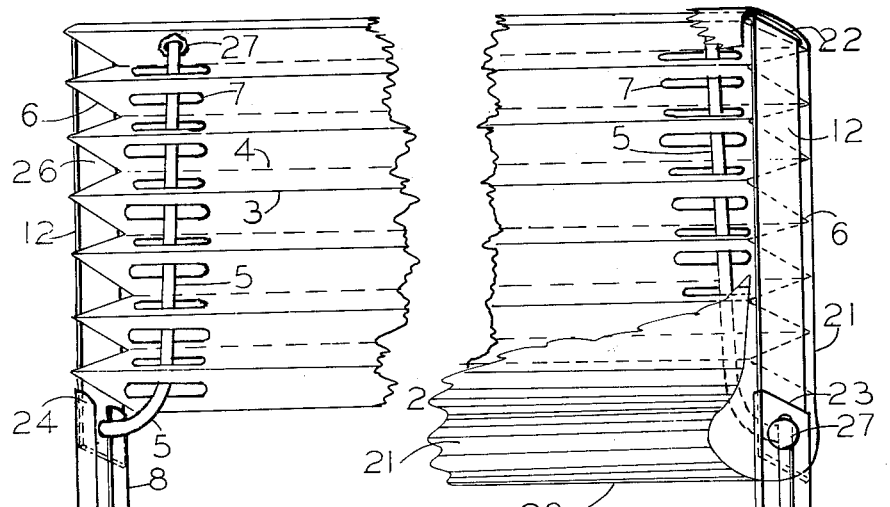
FIG. 1
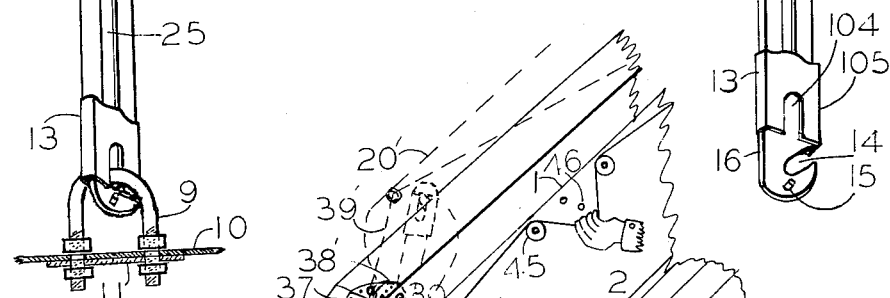
FIG. 2   FIG. 3
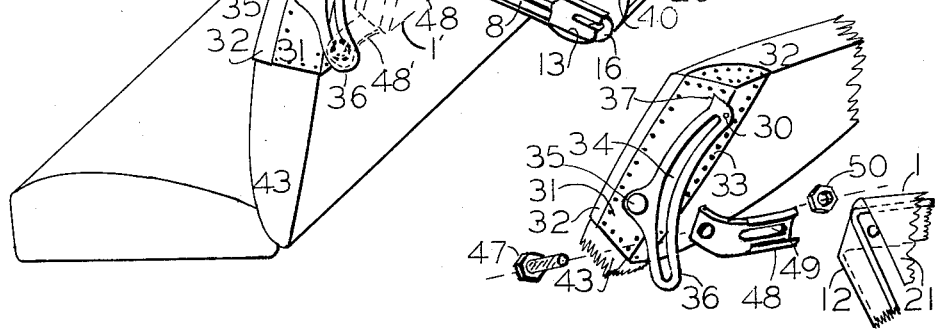

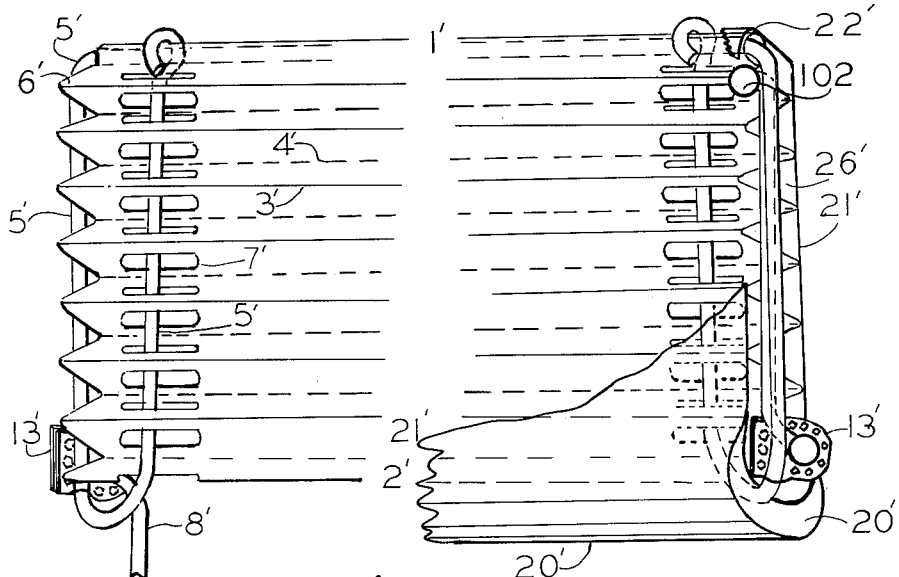
FIG.4
FIG.5
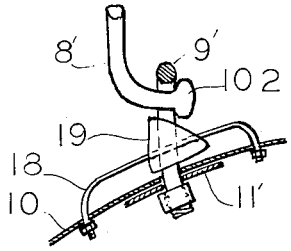
FIG.6
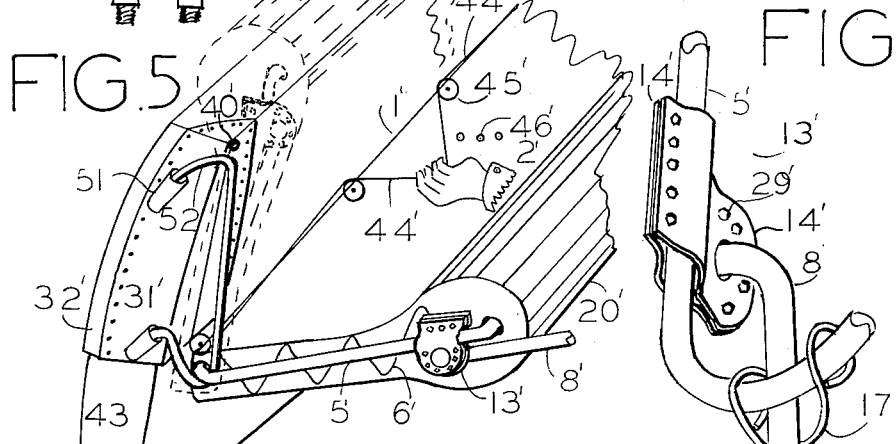
FIG.8  FIG.7

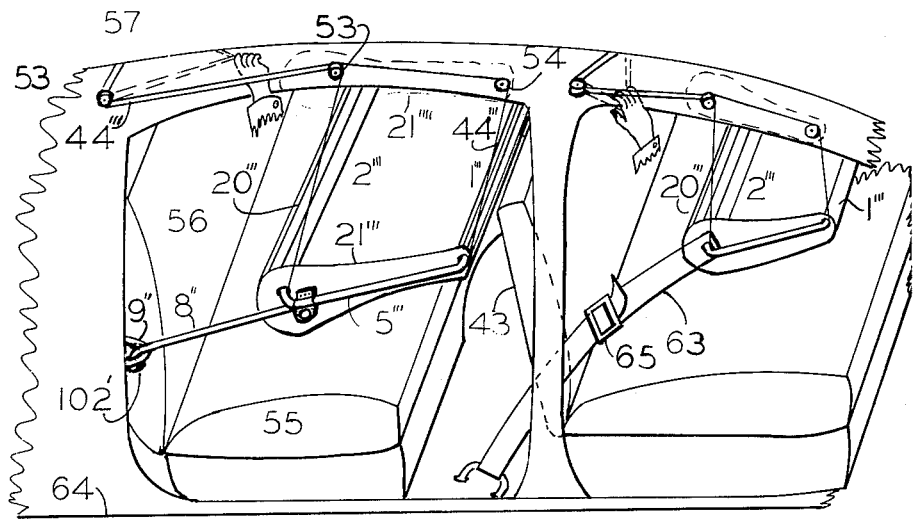
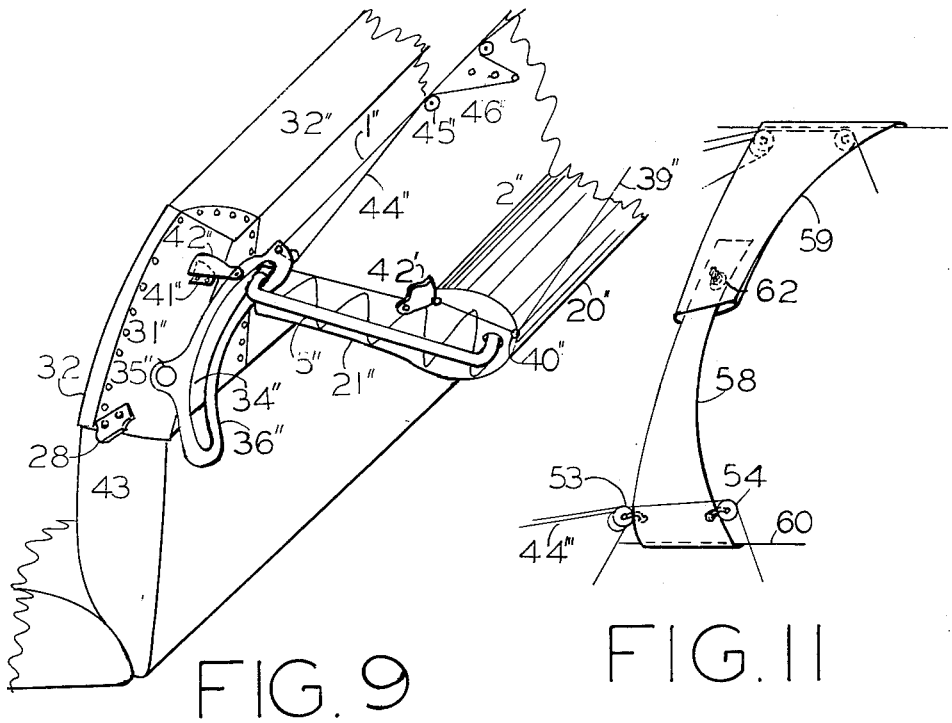

Aug. 3, 1965  P. PRESUNKA  3,198,543
VEHICLE PASSENGER'S PROTECTION DEVICE
Filed March 29, 1962  5 Sheets-Sheet 4
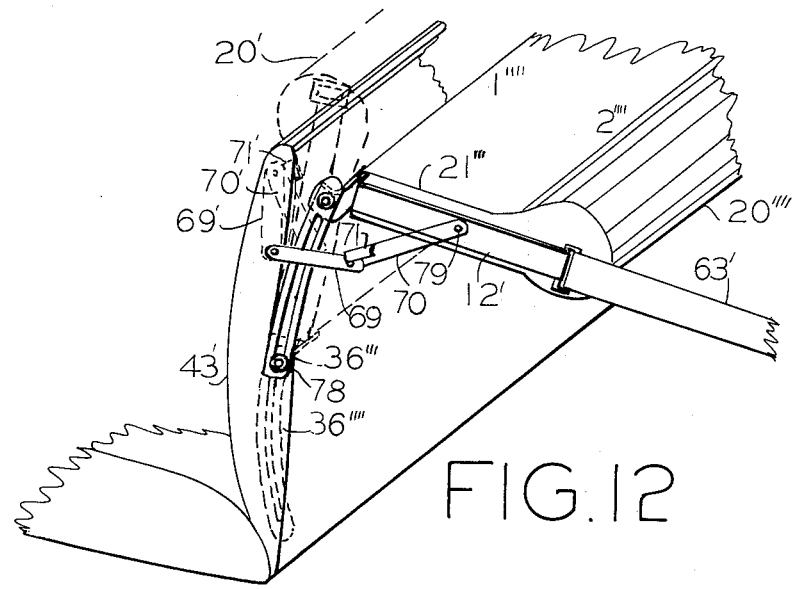
FIG.12
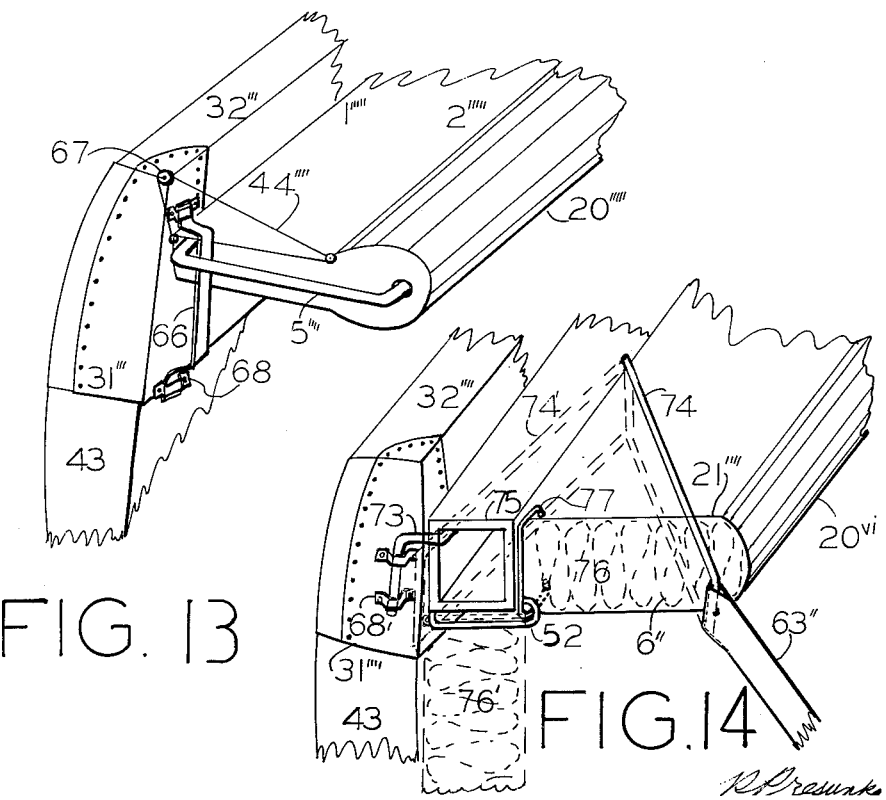
FIG. 13
FIG.14
P. Presunka

United States Patent Office 3,198,543
Patented Aug. 3, 1965

3,198,543
VEHICLE PASSENGER'S PROTECTION DEVICE
Peter Presunka, Ottawa, Ontario, Canada, assignor to Steve Presunka, Ottawa, Ontario, Canada
Filed Mar. 29, 1962, Ser. No. 183,663
20 Claims. (Cl. 280—150)

This invention relates to impact energy absorbing device which is designed to absorb impact energy without subjecting the cargo or personnel in a vehicle to excessive forces under all except extreme crash conditions. This invention describes a vehicle passengers' protection device, but it may also be applied to the protection of cargo with the omission of some accessories and simple adaption of others.

This safety apparatus relies for its functioning on the use of a collapsible impact energy absorbing structure which will collapse in a predetermined manner under a predetermined range of impact forces, when subjected to an impact load by the bodies of vehicle passengers seated immediately behind this structure. The progressive collapsing of this structure materially lengthens the stopping time under crash conditions and reduces the otherwise intolerable peak impulse forces to a tolerable level. This protective device also offers an added convenience of horizontal car tray while in position of use and may also serve as a support for the head and neck for the passengers in the more forward seat in the vehicle, when this device is in a folded away storage condition.

This protective device is shaped and mounted in the vehicle so as to be readily brought into use, and also to be readily placed out of the way into a storage position in such a way as to blend harmoniously with the interior seat structure and upholstery. An alternative vehicle roof storage is also shown for this device in which a simple cord and pulley arrangement is used to hold it in storage condition against the ceiling, directly above the lap region of the passengers, and to lower and raise it between these two positions.

The most widely used protection device of prior art is the safety belt. It is a flexible but relatively unyielding restraining member which holds the passenger in place and subjects him to the same decelerating forces to which the vehicle body is subjected. Even when the safety belt webbing does exhibit some yield or stretch, it will also possess a high degree of resilience and will "kick back" as soon as the applied peak impact force is decreased, thus returning the stored impact energy with very deleterious results. In general, any stretch found in safety belts has been objectionable; and it appears that seat belts can offer only a partial solution to the problem of passenger safety under crash conditions.

Safety belt webbing is now designed to withstand a pull of 5000 lbs. which corresponds to a decelerating force of 33 g's for a 150 lb. passenger or a force of 25 g's for a 200 lb. one. It is almost a certainty that the human tolerance to peak impact forces does not go as high as 33 g's or even 25 g's. A peak decelerating force far in excess of 30 g's may be experienced in a vehicle which is involved in a crash at the road speed of 30 m.p.h. The peak impact force will depend on the speed of the vehicles and the stopping distance, and on the non-uniformity of the deceleration during this stopping distance.

The safety belt is thus a convenient and a very compact device which applies the existing decelerating forces to those parts of the body which are best able to withstand these forces, but it does not materially assist in reducing the peak impact forces which may easily exceed the human tolerable limits. They thus may afford little protection to passengers who may be involved in more serious crashes.

Other prior art safety devices consist of rigid or padded rigid bars which extend across the entire width of the vehicle seat and are essentially group safety devices. They are often very complex structures necessitating extensive mounting modifications in the vehicle. The only impact absorbing feature is that resulting from a deformation of the padded edge. These devices also subject the passenger to the same impact forces which are experienced by the vehicle body.

The safety padding provided in vehicle walls and upholstery will absorb only a small fraction of impact energy, and serves mainly to apply the decelerating force evenly over the largest possible area of the human body.

None of the above described prior art devices utilize to best possible advantage the available space in front of passenger to smooth out the severity of the peaks of impact forces. The present invention describes a safety crash device of unusual simplicity of construction and mounting and which utilizes the available space inside the vehicle with maximum effectiveness to decelerate the passengers under vehicle crash conditions. This device should materially extend the range of effectiveness of safety design for crash conditions, well beyond the capabilities of prior art devices.

The object of this invention is to provide a vehicle passenger protection device which is of simple construction, is readily installed in any vehicle, is readily brought into use and placed into storage, and which utilizes the available space in the vehicle with maximum effectiveness to provide safety to the passengers under most crash conditions.

In the drawings:

FIG. 1 illustrates one variant of a rear seat safety crash apparatus without its front mounting means.

FIG. 2 illustrates the apparatus of FIG. 1 with its front mounting means, in two positions, the position of use in solid lines, and the storage position in dotted lines, indicating its use as a head rest.

FIG. 3 illustrates the details of the front mounting means.

FIG. 4 illustrates another variant of the passenger safety crash apparatus.

FIG. 5 illustrates one of the two rear anchorages of the apparatus.

FIG. 6 illustrates a section along the vertical plane of symmetry of the rear anchorage shown in FIG. 5.

FIG. 7 illustrates a pivotal or sliding connection of the load resisting link with the collapsible impact absorbing structure.

FIG. 8 illustrates another front mounting means for the rear-seat passenger safety crash apparatus.

FIG. 9 illustrates still another front mounting means for the passenger safety crash apparatus.

FIG. 10 illustrates a roof storage scheme of storage of the above described passenger safety crash apparatus.

FIG. 11 illustrates a method of mounting the supporting pulleys in the roof region of the vehicle.

FIG. 12 illustrates one of the suggested modifications in the seat and upholstery of a vehicle in such a way as to blend the invention integrally into the seat structure.

FIG. 13 illustrates a very simple method of mounting the impact absorbing structures described to the hood which slips over the front seat.

FIG. 14 illustrates a sectionally foldable device, in which the rigid guide rods have a prominent feature of the invention.

Figure 15:
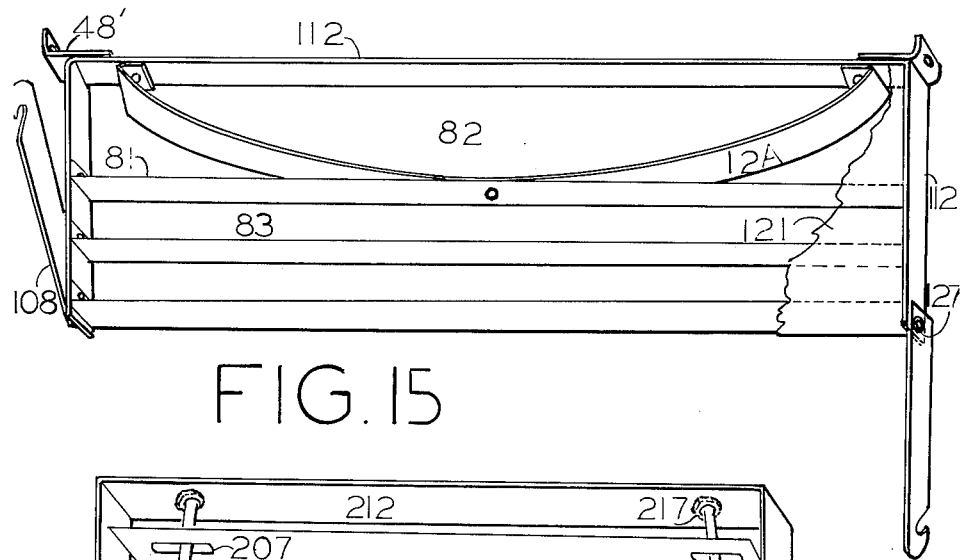
FIGS. 15, 16 and 17 show still other variants in the predetermined and progressively collapsing impact energy absorbing structure.

FIG. 2 shows one type of mounting of this device to front seat structure, placing the rear edge 20 of body in lap region of rear seat passengers. In FIG. 1 is shown one variant of the rear seat safety crash apparatus the body of which consists of a collapsible undulating structure designated generally along its leading edge by the numeral 1 and by 2 along its trailing edge which is also covered with a cushion 20. A rigid frame consisting of a metal strap 12 borders the undulating structure on three sides. The collapsible undulating structure is joined securely along its leading edge to this strap by being wrapped, at 22, around it and rivetted, or otherwise prevented from opening up and separating from the strap. The strap and the structure along the leading edge constitute the bearing surface which resists the load that is transmitted through the body of structure. This leading portion of the structure 1, which also includes the strap, will thus be subjected to a severe bending stress, when subjected to an impact load along the padded trailing edge 20 and in the plane of symmetry of the said structure. This bending stress will subject the strap along the leading edge to a tensile stress which will be greater than the tensile stress transmitted to the side arms of this strap by the load resisting link 8. As a result of this differential in tensile stress in the frame 12, there will be a resutlant tensile stress pulling inwards the two corners of the leading edge of the tray and crushing the structure at the corners. To increase the rigidity of the leading edge, and thus to prevent this crushing at the front corners, the sheet material of the undulating structure is given a few extra rolls 22 around the strap along its leading edge.

The leading portion 1 of the tray is further strengthened by filling the undulations with a rigidifying foamed material which will prevent the buckling of these undulations which are subjected to compressive stresses, and which will also resist the tendency of the impact load to compress the undulating folds in the leading and central portion of the structure while the trailing portion of the structure is being gradually crushed under load. It can thus be seen that while the trailing portion of the impact absorbing structure is being progressively crushed under an impact load, the central and leading portions remain relatively rigid and function as a rigid beam. To insure the above described behaviour of the structure under an impact load it is advisable to use a more rigid foamed material filler in the leading half and a more readily crushable filler in the trailing half of the structure.

There are a number of suitable foamed materials which could serve this function. Rigid urethane foams readily available having wide range of crushing resistances and densities. Their densities range from 2 lbs., per cu. ft. upwards. The 2 lb. per cu. ft. rigid urethane foam possesses compressive yield strengths from 30 p.s.i. at $\frac{1}{10}$ deformation to 250 p.s.i. at $\frac{4}{5}$ deformation. These adhere readily to any surface and require no heat treatment or processing other than foaming. This foam thus offers progressively increasing resistance to deformation which is a highly desirable feature. These foams are available at relatively low prices, thus rendering their use eminently economical.

Other cellular fillers than foamed resins may be employed, such as honeycomb aluminium or light metal mesh work. It is also possible to use bubbled metal which is rendered cellular by bubbling a gas generated chemically while the metal is in a molten state. They may be used to advantage in the leading portion of the impact absorbing structure so as to render it more rigid. The higher cost of these materials may militate against their use.

The sheet material such as sheet aluminium when formed into an undulating structure renders its collapsing highly predictable. The anticlinal axes 3 and synclinal axes 4 become axes of flexure when the undulations are further compressed by a force perpendicular to these axes and lying within the plane of symmetry of the undulating structure. The depth of the structure as defined by the said anticlinal and synclinal axes, renders this structure relatively rigid to any lateral forces, such as would be introduced by a vertical component of impact force, or by the placing of a weight on top of this horizontally disposed structure while it is in position of use as a protection device. This impact absorbing structure is highly directional and for that reason it has designed into it the maximum capacity to absorb impact energy for a given weight of structural material. To assist its predetermined collapsing, rigid guides 5 are used to direct its progress within the plane of symmetry of the structure. These guides 5 are inserted loosely through slots 7 and secured to the rigid strap frame 12 by nuts 27 on the threaded ends of these guide rods 5. The slots should have sufficient length and looseness to assure the free sliding of the threaded through limbs of the undulations while this structure is being collapsed.

The load resisting links 8 are in sliding attachment with the trailing portion of the guide rods 5 and the rigid frame 12. These load resisting links 8 or rear arms have flanges 24 so as to slidingly engage the side straps of the rigid frame 12. These flanges render these rear arms 8 as rigid extensions of the protection device; and enable them to support the structure in a horizontal attitude while in use.

These load bearing arms 8 have slots 25 in which the trailing end of the guide rod is slidingly engaged. The rear end 16 of the arm 8 is reinforced with rivetted plates and slotted partly into a hook 14 which hooks over a clevis 9. A holding sleeve 13 slides over the hook 16 and with its slotted opening engages the portion of the clevis held by the hook. The slot in sleeve 13 prevents the hook 16 from sliding out of engagement with clevis 9 when subjected to an upward or a compressive force transmitted by link 8 by closing the slot opening 14 in the hook 16 by the lower limb 105 of slotted sleeve 13. Pin 15 at the end of the hook 16 prevents the holding sleeve from sliding off the arm when disconnected from the clevis. To unhook the rear link 8 from the clevis 9 it is necessary to slide the friction sleeve 13 upwards and forwards along the link 8 so as to clear the hook 14. The clevis 9 is mounted at any convenient point of the vehicle body in such a way that the part of the clevis engaged by the hook is approximately horizontal and perpendicular to the load resisting link 8. The hip region will probably be found most convenient. These two clevises 9 are the only mountings requiring installation in the vehicle in applying this invention. A reinforcing plate 11 reinforces the clevis anchorage to the vehicle body structure.

FIG. 2 illustrates the front mounting means of the rear seat vehicle safety crash apparatus—in position of use in solid line and in storage position in dotted outline. The mounting bracket 36 is pivotally mounted by a bolt 35 to the end plate 31 which is reinforcing the front seat hood cover 32 which fits tightly over the front seat back rest 43. The hood material may be any suitable seat cover fabric which would blend pleasingly with the vehicle upholstery coverings. The end plates 31 may be of plastic or metal and should preferably be formed around the vertical back edge and the back corner of the seat to help support the apparatus without stressing the fabric of the hood at these stress edges. The plates 31 are rivetted to the hood by rivets 33. FIG. 3 shows such an end plate 31 reinforcing the hood fabric 32. A lug 41 is pressed out of the end plate 31 or otherwise attached to it to engage a hook latch 42 which is pivotally attached to brackets 36 and which is selectably placed in hooked engagement with latch 42 to prevent the apparatus from any loose rocking which may be present in the apparatus while it is used as a head and neck rest while in storage position as indicated by the dotted outline. This lug and latch are not necessary to its operation however. FIG. 2 shows the left hand load resisting rear link 8 in a retracted storage position and which extends rearwardly along the side of rigid frame 12 and hooks over the clevis 9 which is rigidly mounted to the vehicle, at the sides of the rear seat as shown in FIG. 10 and indicated by 9'' in this variant. An L-shaped bracket 48 attaches the impact absorbing structure to the front mounting bracket 36 by means of a bolt 47 which slides and pivots in slot 34. This L-shaped bracket 48 is rigidly attached to the impact absorbing structure by means of a small bolt and flanged bracket edges. The long slot 49 in this bracket 48 provides for some adjustment of this safety apparatus to variations in seat width.

A cord 44 and pulley 45 arrangement is used to raise and lower the impact absorbing structure within the arc shaped slot 24 in the bracket 36. The ends of the cord are tied at the top 30 of bracket 36 and are passed through the pulleys 45 at the front corners of the impact absorbing structure and near the mid-portion of the leading edge 1. The length of the cord is so adjusted as to be stretched taut along the leading edge of the structure when the structure rests at the bottom of the arc slot 34 in bracket 36. In this bottom position, the structure is in position to be pivoted upwards into its storage position as indicated by the dotted lines. To raise the leading edge of the structure from its position in the bottom of the slot to a higher point, it is only necessary to pull on the cord between the two central pulleys 45 and hook the pulled away loop over one of the buttons 46 as shown in FIG. 2. For best position of use the leading edge of the structure should be raised above the level of the trailing edge which contacts the bodies of the passengers.

The apparatus is held in its position of rest as indicated in dotted lines in FIG. 2 by a latch 38 which is pivotally secured to side of thickened trailing edge 20 and biased by spring 106 into hooking engagement with steep edge 37 of bracket 36 as the leading edge 20 of tray structure 1 is placed into storage position shown by dotted lines in FIG. 2. This latch 38 then is urged down by biasing spring 106 over the steep edge 37 of the top of this bracket 36 and holds the apparatus until the latch 38 is released by the hand pull on the cord 39 which lifts the latch 38 against the action of the spring which holds it down over the top 37 of the bracket 36.

The pivoting mounting 35 of the bracket 36 in the end plates 31 permits the front seat which supports the whole apparatus to be freely moved backwards or forwards without in any way necessitating any adjustments in the apparatus. The holding latch 42 would have to be disengaged from the lug 41 for this movement, and the latch 42 may be left in its raised or disengaged position, while the device is in use.

It can readily be seen that the installation of this safety apparatus is extremely simple and requires that the hood 37 fit the particular seat in question and a simple width adjustment of the slot 49 in the L-shaped bracket 48. The only permanent installation required is the mounting of the two clevis lugs 9 in the two hip regions of the vehicle to which are attached the two load resisting links 8. Should it be necessary to remove this apparatus as it would be while cleaning or repairing any interior vehicle structure, it is only necessary to lift the folded structure off the seat together with the hood to which it is attached.

The trailing portion 2 of the impact absorbing structure as shown in FIG. 1 is covered with a cushion 20 which should assist in distributing the impact load as evenly as possible over the area of the body of the passengers in contact with the structure. This trailing cushioned edge 20 of the structure is held in contact with the thigh and hip region of the passengers seated behind it. Seat cushions may be employed to bring the children to the proper level when they are seated along with the adults. When the passengers are either all children or all adults of reasonably even size and height, the impact absorbing undulating structure has sufficient play in the sliding attachment of the rear links 8 to the rigid frame 12 to allow the structure to sag and rest against the thigh and hip region of either the adults or children. The surface of this cushion should have sufficient friction to hold the passengers in place and to prevent them from sliding across the trailing edge under impact conditions. This cushion will also need to be bonded securely to the tray structure. The impact absorbing structure thus engages the passengers' bodies in the hip region which is best able to withstand impact forces. Under the most extreme conditions when the passengers are thrown upwards towards the roof of the vehicle, the hood 32 which supports the leading edge of the impact absorbing structure will be freely lifted off the front seat enabling this structure to align itself completely with the impact forces and to progressively collapse in the predetermined manner so as to give the passengers maximum possible protection under crash condition.

It is readily obvious that this safety apparatus behaves in a manner similar to the lap safety belt, in that it is designed to resist impact forces by its tension members only. It differs from the operation of the lap safety belt in that it utilizes the available space in the vehicle in front of the passenger to decelerate him gradually. This device thus increases the effective stopping distance and stopping time in which the passenger may be decelerated, with greater chance of survival.

FIG. 4 shows another version of the impact absorbing structure. The rigid frame and guide member 5 is formed from a unit length of metal rod which has adequate tensile strength and rigidity. The ends of this rod are bent around in an open loop in the plane of the rigid frame so that the open loop ends may be inserted into the slotted openings 7 which lie in the plane of symmetry of the undulating structure. The looped ends of the rod are then twisted out of their plane and hooked over the rod and rolled sheet material 22 in the leading edge 1 of the structure.

The rear link pivoting and sliding attachment 13 is shown in greater detail in FIG. 7. The two mating steel halves 14 are inserted over the rear link 8 before the ends are enlarged as at 12. These mating halves 14 are bolted in place by a sufficient number of steel bolts 29. The arm 8 may thus be moved into position to engage the clevis lug 9 by pivoting the arm 8 in the attachment 13 or by sliding this attachment over the rigid frame 5. The sides of this rigid frame 5 to which the load resisting links 8 are attached by attachment means 13 extend sufficiently beyond the edge 6 of the undulating structure to enable this attachment to slide unobstructed and to accommodate the pivoting or sliding load resisting link 8 in its storage position as an integral part of the tray structure, as shown at the right hand edge of the apparatus in FIG. 4.

FIG. 6 shows a section VI—VI through the holding clevis 9 to which is attached the rear link 8 as shown in FIG. 5. The enlarged end 12 of the link 8 securely engages the narrowed neck of the clevis 9, and a friction plug 19 is slid down a guide wire 18 to prevent the rear link 8 from being moved backwards and so disengaged from clevis 9. To disengage the rear links 8 from the vehicle it is necessary to move these friction plugs 19 upwards against both the friction and their weight. This method of anchorage thus insures that the safety apparatus is securely anchored in position of use under all possible conditions, and will under no condition become a loose and dangerous missile under impact conditions. Loop 17 in FIG. 7 is used only when the rear links 8 are slidingly attached to the frame 5, and is not used when the link 8 is pivoting in the attachment 13.

In FIG. 9 is shown a mounting means for the version of impact absorbing structure shown in FIG. 4 and it is very similar in operation to that described earlier and shown in FIG. 2 for the structure shown in FIG. 1.

FIG. 8 shows a simpler means of mounting the leading portion of the structure to the end plates of the seat hood 31. A heavy wire bracket 52 is inserted between the edge 6 of the structure and the rigid fame 5 and is then seated into sockets 51. A metal spring clip which is rigidly attached to the top of the end plate 31 may be used to engage the side of the rigid frame 5 and so hold the assembly in its folded position shown in dotted lines in FIG. 8. This spring clip is not shown in the drawings in interests of simplicity. A similar cord and pulley arrangement to that of FIG. 2 may be used to raise and lower the leading edge 1, except that the ends of the cord are secured to the eyelet 49 in the top of the hood end plates 31. The safety apparatus may be brought into use by a strong backward pull on the cushioned or trailing edge 20 of the impact absorbing structure, then by raising the leading edge of the structure to the required height by a hand pull on the cord 44 and anchoring it over an appropriate button 46. A wide retaining washer should be used at the outermost ends of the straight leading edge portion of the rigid frame rod 5 so that the leading edge does not drop down on the inside of the heavy wire brackets 52 while in storage position. This retaining washer is not shown in the drawings in the interests of clarity of illustration of the more significant features of the invention.

In FIG. 10 a vehicle roof storage arrangement is shown for the impact absorbing structure. A simple cord and pulley arrangement is used to raise and lower this structure between its roof storage position as indicated in dotted lines in FIG. 10 and the lap region of the passengers using this device directly below its roof storage, and shown in solid line in FIG. 10. The pulleys 53 and 54 which support this structure may be mounted directly in the roof region of the vehicle body, or they may be mounted in a flat and curved supporting structure shown in FIG. 11 which may be wedged tightly against the roof by wedging its ends 61 behind a ridge 60 width is usually found along the line defining the boundary between the ceiling and the walls of the vehicle. The two limbs of this supporting structure 58 and 59 telescope into each other and its span may be altered by loosening the tightening screw 62 to hold its altered span. The present arrangement uses two single wheel pulleys 54 which support the front portion of the device by a single cord 44, and two double wheel pulleys 53 which support the trailing portion of the device by another but shorter cord 44 and at the same time keep the longer cord which supports the front portion of the device in alignment. Both the front supporting and the back supporting cords 44 are then passed through another pair of double wheeled pulleys 53 mounted in the roof to the rear of the device and approximately overhead so that this section of the double cord may be conveniently pulled out of line by hand as shown in FIG. 10 to raise the device into its storage position against the roof. This pulled away loop may be hooked over a button provided under the trailing portion of device, but not shown in the drawings. The lengths of the cords are easily adjusted at their connection to the collapsible structure so that the double cord section overhead is pulled taut.

This cord suspension of the impact absorbing structure allows the structure to swing upwards freely to align itself instantly with the direction of the impact force. The rear arms 8 are placed only in tension, and a very simple pivoting or sliding arrangement may be used, since the tray does not require to be supported in position thereby. The rigid load resisting links 8 may be replaced with any flexible link or such webbing 63 as is used for the safety belts. A double-ply safety webbing would be more than ample, since the collapsing structure greatly reduces peak shocks. The front seat device illustrated in FIG. 10 uses such as webbing to anchor the impact absorbing device of the apparatus to the vehicle body. The front seat version of this safety apparatus does not extend across the entire seat because of the steering column and wheel, but covers slightly over half of the seat width.

The load resisting webbing which anchors the end of the impact absorbing device next to the steering column is passed through the seat structure and upholstery in the same manner as the safety belt webbing. Any single safety belt webbing would be sufficient, since the impact peaks are greatly reduced by the action of the structure as described earlier in the invention.

In FIG. 13 is shown still another means of mounting the impact absorbing device shown in FIG. 4. A flat bracket 66 straddles through the space between the rigid frame rod 5 and the edge 6 of the device and is inserted into sockets 68. A single pulley 67 mounted on top of each side of the hood plate 31″ enables the device to be pivoted into position of use from its storage position as shown in dotted lines in FIG. 8. The cord also raises the leading edge while the device is being tipped backwards into its use position. The rear linkage is not shown, but any attachment may be used, since the rear links are no longer required to support the trailing edge of the tray. A safety belt webbing may be used to attach the trailing edge to the vehicle to the rear of the device, such as shown in other figures of the drawings. This simple method of mounting requires no latches to lock it in storage position, since the weight and downpush on the device will prevent it from moving away from its storage position or when in use as a head and neck rest as shown in other drawings in dotted lines.

In FIG. 14 is shown an impact absorber which is partly foldable, in which a rigid front beam 75 remains fixed and the undulating crushable structure 76 is pivoted and slid into storage position 76′ under the beam 75 by means of interlocking brackets 52 and 77. Rigid guide bracket 74 is pivotally secured to beam 75 and pivots into alignment with webbing 63″ which is removably anchored to vehicle along side of seat structure. The heavy wire bracket 52 fastened to the beam engages another wire bracket 77, attached to the collapsible structure 76. This foldable collapsible structure 76 may consist wholly of undulating sheet metal structure or it may also be filled with a cellular impact absorbing material which could extend its impact absorbing range. This structure pivots about the wire bracket 52 downwardly into position shown in dotted lines 76′, after the rigid guide brackets 74′ are pivoted into parallelism with the beam 75. A holding bracket 73 engages slots 68 in the hood reinforcing plate 31″″.

In FIG. 12 is illustrated a suggested modification in the vehicle seat structure in order to combine in an inobtrusive manner the inventive apparatus disclosed with the vehicle interior styling and accessibility so as to insure the fullest use of available space to the problem of survival under serious crash conditions. The upper and trailing portion back rest of the seat is recessed to accommodate the impact absorbing structure in a stored attitude as shown in dotted lines of FIG. 12. Two piece tandem linkage, 69 and 70, opens from its "jackknifed position" in storage (69′ and 70′) to an open link 69, 70 in which a sag is introduced by its own weight, and by a lug 71 which prevents further reverse pivoting. By pushing down and pulling on the trailing edge 20″″, the leading edge 1, is raised and it pulls up the sliding bracket 36″″ until it engages a pin 78. The pin 79 is located ahead of the lateral line of gravity so that the structure to the rear of this line is heavier than the front part and this urges upwards the leading edge of the structure, and renders this mounting self supporting. The usual safety belt webbing 63′ may be used to anchor the impact structure to the vehicle to the rear of the structure.

To place it into storage position it is first necessary to disconnect the rear links from anchorage to the vehicle, then to raise the trailing edge, and push it forwards, then to push up against the sag in the two links 69 and 70 to enable them to jackknife as in 69′ and 70′. A simple holding latch may be employed to lock the device in this stored position. Such latches were described earlier in connection with other mounting means.

FIG. 12 thus suggests essentially a car manufacturer's approach to such a practice of the present invention that would result in a great economy in the available space, since the impact absorbing device is incorporated into the seat structure itself. Such an approach would result in an overall styling and appearance which would not in any way depart from the expected high standards in modern cars and other passenger carrying vehicles.

Figure 16:
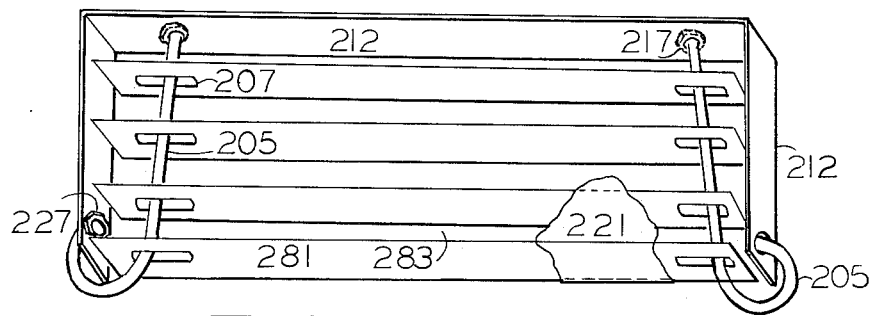

FIG. 15 shows still another variant in the predetermined and progressively collapsing impact energy absorbing structure. This structure relies for the required rigidity on the metal strips 81 and auxiliary frame member 12A, and frame 112 when these rigidity members are supported by the crushable filler material which fills this structure to at least the full depth of these members. The volume 82 enclosed between the auxiliary member 12A and the frame 112 is filled with a filler material which is more resistant to crushing than that in the trailing portion of the structure. This volume 82 therefore acts as a rigid beam portion of the structure and prevents the failure of the structure when it is subjected to a severe bending moment as a result of impact loading along the trailing edge 20. The remaining volume 83 in the structure is filled with more readily crushable material which fills the spaces between the rigid frame 112 and the auxiliary member 12A and the rigidity metal strips 81. This more readily crushable material in volume 83 therefore yields first enabling the passenger's bodies to become imbedded into this structure and to continue collapsing the structure in a broad arc about the body impact point, until most of the impact energy is dissipated. Each passenger will thus crush the body of the structure immediately in front of him, and this crushed volume will be determined not only by the weight of the passenger, but also by the body size or breadth as well. The structure shown in FIG. 16 shows freely floating rigidity strips 281 which have high lateral flexibility and will permit this selective crushing in a smaller arc about the point of body impact. In FIG. 16 the leading portion is filled with a more rigid filler material and acts as a rigid beam, while the trailing portion of the structure is filled with most readily crushable material. The long slots 207 in the rigidity strips assure free progress of these strips 281 along the guide rods 205. These rods are bolted to the rigid frame 212 by threaded ends and nuts 227. A sheath 221 covers this composite structure and adds additional rigidity but is sufficiently flexible not to pile up into rigid ridges and so present a hazard to the passengers.

The more resistant filler material in volume 82 of FIG. 15 will thus retain its rigidity and act as a rigid beam until the less rigid material will have been compressed by two passengers at 84 and 85. The presence of a third passenger at the centre position 86 will impose more severe bending stresses at the centre portion, but the depth of the beam portion 82 would prevent the failure of the structure until all of the softer material had been used up and these severe stresses reduced. With only two positions occupied, 84 and 85 more than ⅔ of the total depth may be penetrated before the structure would lose its rigidity, at which point it would still function as a retaining structure.

Srips 81 in FIG. 15 are rivetted to the rigid frame 112, and as these strips are swept up in front of the bodies which collapse the structure, these rivet joints become detached. The sheath 121 prevents the filler material from being pushed out of the plane of the structure, which, if allowed to occur would render the structure unpredictable under collapsing, and therefore hazardous. The more rigid leading portion thus supports the outer sheath 121 which contains and supports the more crushable material in the trailing edge next to the passengers.

Rigid urethane, which is normally employed in the padding of vehicle structures, is very suitable for this filler material. This material must have excellent bonding characteristics, which would bond the rigidifying members 112, 12A and 81 into a very strong and cohesive structure. Its tensile strength is nearly twice the crushing strength. In the structures of FIGS. 15 and 16 materials of higher bonding strengths would be needed than in structures shown in FIGS. 1, 4 and 14. A wider cushion may also be used to distribute the forces over the greatest possible area of the body and to engage the thigh and hip regions. The rear arms 108 may pivot about their connection 27' to the rear of the rigid frame 112. The front mounts 48' previously described may be used to mount either structure in FIG. 15 and FIG. 16 to the front seat structure.

Figure 17:
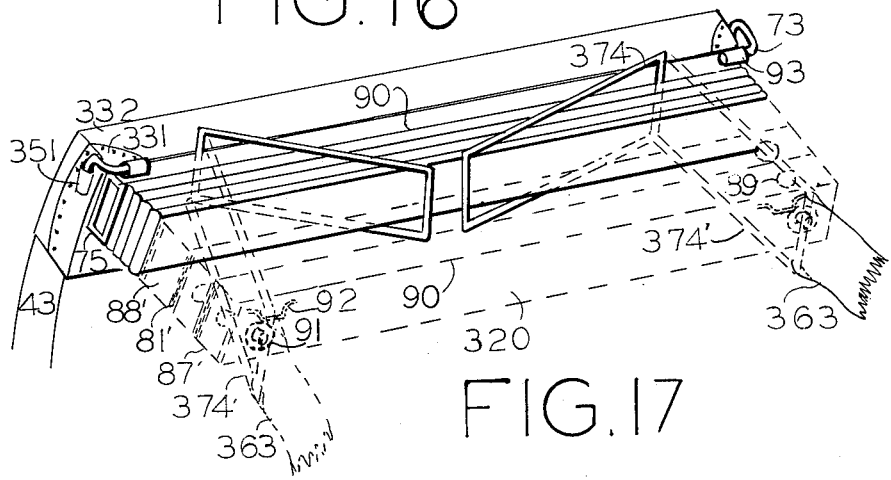

In FIG. 17 the impact absorbing device is a bellows-like structure from strong flexible fabric which can maintain air pressures up to 80 lb. per sq. inch or so. Lateral strips 81" give it lateral rigidity, and give the structure sufficient rigidity to collapse gradually as a unit under an impact load along the trailing edge and also prevent the top and bottom surfaces from deforming when in use position. The metal strips 81" are inserted between double fabric walls 87 which are sewn together near the top and bottom walls. The ends of the bellows, 88 are also closed by a strong foldable fabric which can withstand high air pressures. Air vents 89 are cut in the bellows partitions 90 to enable air to enter when the structure is extended from its storage position, shown in solid lines, to its position of use, shown in dotted lines. Two large push operated air intake valves 91 are actuated by thumb pressure while pulling outwards on the handles 92, to extend the bellows-structure. The brackets 74' are pivoted out of their storage position by the extending movement of the bellows structure, and these rigid rod brackets act as guides to guide the collapsing structure and also as load resisting rear links to which are attached additional links 63'" connecting the structure of the vehicle body. These rigid brackets 74' pivot in a beam 75 which supports the structure against failure due to bending moment as a result of impact loading. Front mounting means consists of an elbow bolt 73 pivoting in a sleeve 93 which is attached to the beam 75, which bolt 73 is inserted into a socket 51 attached to the reinforcing plate 331 of the hood 332 which slips over the front seat 43. The end walls 88 of the bellows structure may be closed by a very strong and sufficiently porous material which will permit air to be forced through it under pressure at the minimum required rate. For very high impact conditions the bellows-like device may also incorporate pressure activated air exit valves which open at some predetermined high pressure to permit the device to collapse at a more rapid rate to further smooth out the sharp impact forces and increase the stopping time and stopping distance of the passengers behind it. In its extended position shown in dotted lines the structure rests in the lap region. The brackets 3741' will hold the structure down against the hip region under impact. The fabric covering will grip the clothing of the passengers to insure proper positioning. The rigidity strips 81 which are inserted between the fabric partitions 90 enable the structure to extend to its fully opened position very readily, since the large intake valves 91 permit a rapid and unhindered ingress of air. These thumb-operated valves 91 are urged into a closed position by a compressed spring mounted on the valve stem and compressed between the rear face 20 and enlarged end of stem. The valve is urged into a shut position by the internal air pressure when the device is subjected to an impact load.

To place this bellows-like device into storage position it is necessary first to detach the rear links 363 from the vehicle body, then depress the thumb operated air intake valves 91 and push on the handles 92 to place the collapsed structure closely behind the front seat beam 75; then the brackets 374' are pivoted inwards to support the bellows as in its storage position 374 as shown in solid lines in FIG. 17. This structure will align itself with the impact forces and may be easily removed and installed.

A brief summary of some important aspects of the present invention may be in order:

(1) This invention incorporates only one pair of load-resisting links which are placed only in tension—similar to the seat belt, and which are designed to hold under all possible conditions.

(2) The impact absorbing device aligns itself with the slope of the impact forces, between the horizontal and the vertical and is therefore effective under most conditions, also similar to the seat belt action.

(3) This apparatus poses very few installation problems.

(4) The impact absorbing function of the impact absorbing device relies on the characteristics of filler materials which sets in beyond the elastic limit, and also on the designed strength of the rigid members which insure that the yieldable materials will not deform outside of the limits set by these outer strength members which utilize the strength characteristics of the materials below and up to their elastic limit.

(5) This apparatus may be applied either as a group or an individual protection device.

(6) This apparatus has been conceived with due regard for general convenience of the passengers and interior vehicle styling as well as the cardinal consideration of safety under crash conditions.

This invention describes a distinctly positive approach to the problem of survival in vehicular crashes, which is in sharp contrast with the rather passive approach of the safety belt solution to this problem. The safety belt holds the passenger in complete constraint to his seating position, without any side movement along the vehicle, so completely that he becomes a part of the vehicle in any further resolution of impact mechanics. There is no buffer mechanism to separate him from the brute impact mechanics of the machine itself. The above considerations may partly account for the slow public acceptance of the safety belt. The present invention is a group safety device, which also permits side movement in the seat, while the device is in use. This invention places a buffer between the passenger and the vehicle, which buffer isolates the passenger from the impact forces which are present in the vehicle, by reducing the peak forces and lowering the averaged-out impact force as well. This invention emphasizes a positive step to the solution of passenger safety and sets the human element apart from the machine. The present device has several other advantages over that of the safety belt. The loose safety belt webbing does not engender the beauty or sense of neatness in the vehicle interior. The necessity of personal attention, especially in reference to child and senior passengers, will pose awkward problems. The case where the number of passengers exceeds the available seat belt positions may make seat belts entirely unusable. The problem of locating belt webbing under night conditions, complicated further by crowding, may convert their use to a bedlam and utter confusion. The present invention is a group device which is simple to apply and largely avoids the above described problems.

In conclusion, it may be safely stated that the concept of "deceleration through space" which is utilized in this invention may be easily extended to keep in step with the increasing speeds of modern vehicles; whereas the safety measure offered by the safety belt is limited by the absolute tolerance limits of a human body to impact force, and its effectiveness will therefore be progressively reduced as the travel speeds increase.

The following pages of the appendix to this disclosure are intended to give a fuller appreciation of the probable magnitudes of impact forces and energies involved in a crash and the relationship between these and the vehicle speeds and stopping distances during impact.

APPENDIX TO DISCLOSURE

*Calculation of impact energy and impact forces involved in vehicle crashes*

The impact forces will be expressed in terms of the gravitational force $g$, which gives us our normal weight under rest condition.

The impact energy will be expressed in foot-pounds or in terms of an "equivalent dropping height" from which the vehicle would have to be dropped to acquire the same speed and energy through the action of gravity or one $g$.

By equating the kinetic energy ($\frac{1}{2}MV^2$) of the moving vehicle and passengers with the potential energy or the energy possessed at a certain "equivalent dropping height," we have $$1/2 MV^2 = MgH$$

$$H = \frac{1}{2}\frac{MV^2}{Mg} = \frac{V^2}{2g} = \frac{V^2}{64}$$

$$H = \frac{V^2}{64}$$

where $M$ = mass of the moving body in poundals ($=W/g$).
$V$ = velocity of speed of the moving body in feet per second.
$g$ = acceleration of gravity in feet per second per second ($=32$).
$H$ = equivalent dropping height in feet above ground.
Also not that weight ($W$) $=Mg$ and $M=W/g$.

A vehicle travelling at a road speed of 30 miles per hour (30 m.p.h.) which is also the same as 44 feet per second has the same energy and speed as it would acquire by dropping from its equivalent dropping height (H)

$$H = \frac{V^2}{64} = \frac{(44)^2}{64} = \frac{1937}{64} = 30 \text{ feet}$$

Thus the equivalent dropping height is 30 feet above ground for a vehicle travelling at a road speed of 30 m.p.h. at the moment of a crash. Common experience teaches us that falls from such heights are very often fatal.

For a vehicle travelling at a road speed (V) of 45 miles per hour (or 66 feet per second), the equivalent dropping height (H)

$$H = \frac{V^2}{64} = \frac{(66)^2}{64} = \frac{4356}{64} = 68 \text{ feet above ground}$$

The energy (and also its equivalent dropping height) of a travelling vehicle more than doubles by increasing its speed by only 50%, that is from 30 to 45 miles per hour. The above equivalent height of 68 feet poses a very serious problem indeed of safe deceleration. A steadily applied force of one $g$ would require a distance of 68 feet to bring the travelling vehicle to a full stop—or a distance of 17 feet under a restraining force of 4 $g$'s, or a distance of 8½ feet under a restraining force of 8 $g$'s. Now a restraining force of 8 $g$'s would subject a 150 lb. passenger to a push of 1200 lbs., and this restraining force would have to be steadily applied for an interval of time defined as stopping time (T)

$$T = 8.5 \times \frac{2}{66} = 0.76 \text{ second or } \frac{3}{4} \text{ second}$$

Now the stopping distance in a crash is the sum total of distance travelled against an opposing force due to a crash, and it usually consists of the depth of interpenetration of the vehicle and the other object involved. This interpenetration may include the crumpling of the front bumpers, and part of the car body. A distance of 2 feet is probably a good estimate of such stopping distance. Such short stopping distance will subject the vehicle body to an averaged-out decelerating force of $$\frac{68}{2} = 34 \ g\text{'s}$$

The stopping time is $$2 \times \frac{2}{66} = 0.06 \text{ second}$$

or 1/16 second. Now this is the required and steadily applied force to bring the vehicle to a stop. Under actual condition, this stopping will not occur smoothly, but in sharp bursts, and this would in turn generate much higher forces, which may be called peak impact forces, and it may rise to nearly double that of the averaged out force or 60 g's. Now if the passenger is securely strapped to the vehicle, he will be subjected to the same peak impact forces. Now it is almost a certainty that the average human body will not tolerate such extreme forces. An averaged out force of 34 g's would require a safety belt webbing of 34×150=5100 lbs. for a 150 lb. passenger, and a belt which must withstand a force of 34×200=6800 lbs. for a 200 lb. passenger. Now if we are to allow for peak impact forces the belt will have to withstand nearly twice that force. Safety belts are usually rated for much lower strengths, up to 6000 lb. pull or so.

There is also little doubt as to what could happen in cases of direct collision of a vehicle travelling at the above speed (of 45 m.p.h.) and stopping within the stopping distance of 2 feet, as specified. A human is not very likely to survive in a safety belt through such intense forces, with a minimum possible value of 34 g's and possibly as high as 80 g's. No belt would hold that, and no human bone structure could be expected to sustain such a pull. The belt or anchorage would probably fail long before the peak and the passenger would be hurled forwards against the vehicle or ground under completely unpredictable conditions with equally unpredictable results.

With no safety precautions at all the passenger would continue with the vehicle speed of (66 ft. per second or 45 m.p.h.) until he smashed into some object, and the impact forces will depend on the hardness of this object; if he hits a solid object directly, the peak forces may be very high and modified only by the impact mechanics of the particular part of the body which contacts the solid object.

If the passengers used the crash bars of prior art which do not specifically incorporate this invention's principle of deceleration through distance, the body will be subjected to the same impact conditions as the vehicle and will also fail to obtain proper protection.

Now the present invention introduces an impact absorbing device which increases this assumed stopping distance of 2 feet by nearly another foot—(say 3/4 of the depth of the impact absorbing structure) and this reduces the averaged-out impact force from 34 g's to 22½ g's. It also nearly completely neutralizes the peak impact forces, since it permits the body to crush the structure during these intense peak values, and thus materially increases the chances of survival under serious crash conditions.

I claim:

1. In a conveyance a directional impact energy absorbing device which includes
   (a) a deformable structure which exhibits substantial rigidity to lateral forces which tend to deflect said structure out of a plane of predetermined yielding, and
      (i) rigidifying means to maintain said structure within said plane of yielding, said means consisting of undulations in a sheet included in said structure, said undulations also defining axes of flexure, and
      (ii) rigid guide means which constrain said axes to planes parallel to said plane of yielding, and
   (b) rigid outer frame which constrains one edge of said deformable structure against movement in opposition to load applied to another edge which is substantially parallel and opposite to said one edge, and
   (c) mounting and orienting means for maintaining said plane of yielding of said structure in alignment with said load, and
   (d) links resisting load in tension and attaching said rigid outer frame to points in said conveyance located to rear of said structure, and
   (e) resistance to collapsing means enabling said structure to undergo said predetermined yielding in said plane under said load and so absorb energy.

2. A directional impact energy absorbing device substantially as described in claim 1 in which said deformable structure consists of a bellows-like selectably collapsible, strong fabric-walled body, said body having transverse partition walls connecting opposite walls of said body, and communicating vents in said partition walls and valves in outer walls of said body, and in which said rigidifying means is comprised of flat strips included in said partition walls, and in which said rigid guide members are metal brackets straddling said body, said brackets being pivotally connected to said rigid outer frame and connecting said rigid outer frame to said load resisting links, and in which said resistance to collapsing means is comprised of escaping trapped gas placed in compression in said bellows-like body under said load.

3. A directional impact energy absorbing device substantially as described in claim 1 in which said deformable structure has a shape of a long deep, flat tray body, in which two flat and opposite surfaces are substantially greater than the remaining surfaces, and in which said plane of predetermined yielding is included between and is parallel to said two flat surfaces and in which each of said two flat surfaces include an array of said axes of flexure which are oriented substantially along the length of said tray body.

4. A directional impact energy absorbing device substantially as described in claim 3 in which said flat tray body is a bellows-like, selectably collapsible structure consisting of an outer fabric enclosure incorporating communicating valves with its exterior and substantially rigid partition walls each of which is perpendicular to said flat surfaces and extends along the length of said tray body and is secured to both of said flat surfaces, and in which said rigid guide members are metal brackets having parallel limbs which straddle said tray body, said brackets being pivotally secured to said rigid outer frame and connecting it to said rear links, and in which said resistance to collapsing means consists of trapped, escaping air placed in compression in said bellows-like structure under said load.

5. A directional and yieldable impact energy absorbing structure substantially as described in claim 1 in which said resistance to collapsing means consists substantially of predetermined resistance to crushing offered by cellular, solid filler material partly bounded by said axes of flexure and placed in compression by further flexing of said sheet along said axes in response to said load.

6. A directional and yieldable impact energy absorbing structure substantially as described in claim 5 in which said cellular filler material is a foamed-in-place plastic.

7. A directional and yieldable impact energy absorbing structure substantially as described in claim 1 in which each of said load resisting links is a rigid member slidingly attached at one end to said rigid outer frame and detachably attachable to a point in said vehicle to the rear and being telescopically slidable into said rigid outer frame.

8. A directional and yieldable impact energy absorbing structure substantially as described in claim 1 in which each of said links is a rigid flat strap member slidingly mounted at one end in said rigid outer frame and having formed an open hook at another end, to engage a lug secured to said conveyance to rear of said structure, and a partly slotted retaining sleeve slidingly mounted on said strap member, said sleeve sliding over said hook and closing the opening in said hook and receiving said lug and abutting against it thus resulting in a secure and pivoting connection of said rear links to resist said load in tension.

9. In a conveyance having front and rear seat structures, a combined utility tray and a directional energy absorbing device for use of passengers in said rear seat structures substantially as described in claim 1 in which said mounting and orienting means is adapted to mount said tray horizontally in position of use in a recessed region of said front seat structure, said mounting means also enabling said tray to be pivoted and slidingly placed into said recessed region during storage.

10. In a conveyance, a directional and yieldable impact energy absorbing structure which exhibits substantial rigidity thereby enabling said structure to resist deformation when subjected to lateral forces which tend to deflect any portion of said structure out of a predetermined plane of yielding, comprised of
 (a) rigidifying means to maintain said structure within said plane of yielding, said means consisting of
  (i) undulating sheet material which includes arrays of preformed axes of flexure to control further flexure and consequent yielding of said structure, and
  (ii) rigid guide members to hold and guide said axes in planar arrays under all conditions, and
 (b) a rigid outer frame which constrains one edge of said yieldable structure against movement in opposition to load which is applied to an opposite edge of said structure, and
 (c) mounting and orienting means for maintaining said structure in said conveyance in a substantially horizontal plane under usual conditions of use in said conveyance, and also enabling an instantaneous and substantially unlimited alignment of said structure with the direction of said load under crash conditions of said conveyance, and
 (d) load resisting links attaching said rigid outer frame to points in said conveyance located to rear of said structure, and
 (e) resistance to collapsing means enabling said structure to offer substantial and predetermined resistance to said yielding, and so absorb energy generated under crash conditions of said conveyance.

11. In a conveyance, a directional and yieldable impact energy absorbing structure which exhibits substantial rigidity thereby enabling said structure to resist deformation when subjected to lateral forces which tend to deflect any portion of said structure out of a predetermined plane of yielding, comprised of
 (a) rigidifying means to maintain said structure within said plane of yielding, said means consisting of
  (i) Undulating sheet material which includes arrays of preformed axes of flexure to control further flexure and consequent yielding or said structure, and
  (ii) rigid guide members to hold and guide said axes in planar arrays under all conditions, and
 (b) a rigid outer frame which constrains one edge of said yieldable structure against movement in opposition to load which is applied to an opposite edge of said structure, and
 (c) mounting and orienting means for maintaining said structure in said conveyance in a substantially horizontal plane under usual conditions of use in said conveyance, and also enabling an instantaneous and substantially unlimited alignment of said structure with the direction of said load under crash conditions of such conveyance, said mounting and orienting means enabling said alignment to take place in response to said lateral forces which are substantially lower than those which would be required to overcome said resistance to deformation.
 (d) load resisting links attaching said rigid outer frame to points in said conveyance located to rear of said structure, and
 (e) resistance to collapsing means enabling said structure to offer substantial and predetermined resistance to said yielding, and so absorb energy generated under crash conditions of said conveyance.

12. A directional and yieldable impact energy absorbing structure substantially as described in claim 10 in which said sheet is from metal and in which said guide members are rigid metal rods which extend loosely through slotted openings in substantially vertical portions of limbs of said undulations, the ends of said rigid metal rods being secured to said rigid outer frame, and in which said resistance to collapsing means is comprised of substantial resistance to further flexure of said sheet of metal along said axes.

13. A combined rear seat utility tray and a directional and yieldable impact energy absorbing structure substantially as described in claim 12, in which said mounting and orienting means includes a cord and pulley arrangement to adjustingly maintain said tray in substantially horizontal position in a lap region of said passengers.

14. In a conveyance having front and rear seat structures, a combined directional and yieldable impact energy absorbing structure and utility tray for use of passengers occupying said rear seat comprised of:
 (a) a body of resistingly collapsible construction including undulating sheet material possessing substantial tensile strength and having preformed axes of flexure to control yielding of said structure, and rigid guide members which maintain said axes in predetermined plane of yielding, and
 (b) rigid outer frame to constrain one edge of said yieldable structure against movement in opposition to load, and
 (c) load resisting links attaching said rigid outer frame to points in said conveyance located to rear of said structure, and
 (d) mounting and orienting means for maintaining said structure in said conveyance in a plane of said load, comprised of hood-like cover which removably fits over back part of said front seat structure and which supports rigid mounting brackets in which said tray structure is slidingly and pivotably mounted, said cover being readily removable by upwardly directed force applied to said cover or to said body.

15. In a conveyance having front and rear seat structures for use of personnel, a combination utility tray and a directional impact energy absorbing device for use of personnel occupying said rear seat structure, said tray being placed in lap region of said personnel adjacent its rear edge, comprised of:
 (a) a deep tray body of resistingly collapsible construction, said tray body relying for rigidity upon undulations in a sheet of strong and flexible material which extends throughout said body, and
 (b) a rigid outer frame comprised of a metal bar extending along edges other than said rear edge of said tray body and constraining a front edge of said tray body against movement in opposition to load applied to said rear edge and
 (c) rigid guide bars which extend transversely of said undulations and which constrain said undulations against any movement out of the plane of extension of said guide bars, but permitting their movement within said plane, and
 (d) mounting and orienting means for mounting said tray body in a substantially horizontal position during use by said personnel, said mounting means including a hood-like cover adapted to be fitted over said front seat structure, said cover having reinforced portions to support mounting brackets to slidingly and pivotally receive said tray body, and cord and pulley arrangement to adjustingly support said front edge of said tray in said brackets, and
 (e) load resisting links attaching said rigid outer frame to points in said conveyance to rear of said tray body.

16. In a conveyance, a directional energy absorbing device comprised of:
   (a) a resistingly collapsible body having a shape substantially of elongated rectangular prism having flattened sides, said body including
      (i) an undulating sheet of tough material extending throughout said body along a plane parallel to said flattened sides and having preformed axes of flexure to control further flexing in response to applied load, and to resist deflection of any portion of said body in response to forces which are perpendicular to the plane of said flattened sides
      (ii) rigid guide members to guide a displacement of said axes along a plane of extension of said rigid guide members, and
   (b) rigid outer frame which constrains one edge of said body against movement in opposition to said load applied to another edge which is parallel and opposite to said one edge, and
   (c) load resisting links detachably attaching said rigid outer frame to points of said conveyance which are located to rear of said body, and
   (d) resistance to collapsing means included in said body to resist said collapsing and so absorbing energy, and
   (e) mounting and orienting means enabling said device to be selectably placed in position of use or storage.

17. In a conveyance a directional energy absorbing device comprised of
   (a) a resistingly yieldable body adapted for maximum energy absorbing effectiveness to be deformed under predetermined load in a preferred plane of yielding, said body including an undulating sheet having preformed axes of flexure to control deformation of said body under load in said preferred plane of yielding and to increase rigidity and resistance of said body to force acting perpendicular to said preferred plane of yielding.
   (b) rigid outer frame which constrains one edge of said body against movement in opposition to said load, and
   (c) rigid guide members secured rigidly to said outer frame to guide displacement of said axes during said deformation along a plane parallel to said preferred plane of yielding, and
   (d) load resisting links attaching said rigid frame to points of said conveyance located to rear of said body, and
   (e) mounting and orienting means enabling said body to be placed, instantly and in response to applied load, into alignment with the plane containing said applied load and an edge of said body to which said load is applied.

18. A directional energy absorbing device substantially as described in claim 17 in which said rigid outer frame and rigid guide members are integral extensions of each other, and in which said yieldable body is an undulating metal sheet with undulating limbs being located alternately below and above said preferred plane of yielding, said undulating sheet being traversed in the region of its ends by said rigid guide members.

19. In a conveyance a directional energy absorbing device comprised of
   (a) an elongated and flattened, prism shaped body, of substantially rectangular cross section, and having a major axis of said cross section lying in a preferred plane of yielding, said body having extending along said preferred plane an undulating sheet in which undulating folds extend along the length of said body, said undulating folds also defining axes of flexure in said sheet, and
   (b) rigidifying brackets extending transversely of said axes and along planes parallel to said preferred plane of yielding, and
   (c) a rigid outer frame to constrain one edge of said body against movement in opposition to applied load and to maintain said rigidifying brackets parallel to said preferred plane of yielding, and
   (d) load resisting links attaching said outer frame to points in said conveyance to rear of said body,
   (e) mounting and orienting means enabling instantaneous alignment of said preferred plane of yielding of said body with applied load.

20. In a conveyance, a directional energy absorbing device which includes
   (a) a deformable structure which offers predetermined resistance to yielding under load in a predetermined plane which includes the greatest section through said structure, and which exhibits substantial rigidity to lateral forces which tend to deflect said structure out of said predetermined plane, and
   (b) rigid outer frame which constrains one edge of said structure against movement in opposition to load, and
   (c) rigid guide members which extend transversely of said structure and parallel to said predetermined plane, and which are rigidly secured to said rigid outer frame
   (d) links resisting load in tension and connecting said outer frame to points in said conveyance to rear of said structure
   (e) mounting and orienting means for maintaining said predetermined plane of said structure in alignment with said load.

References Cited by the Examiner

UNITED STATES PATENTS

| | | | |
|---|---|---|---|
| 2,328,263 | 8/43 | De Stefano | 296—84 |
| 2,654,616 | 10/53 | Mockli | 280—150 |
| 2,749,143 | 6/56 | Chicka | 280—150 |
| 2,750,203 | 6/56 | Biehler | 280—150 |
| 2,859,048 | 11/58 | Munn | 280—150 |
| 2,923,558 | 2/60 | Groenewegen | 280—150 |
| 3,003,786 | 10/61 | Liston | 280—150 |
| 3,042,137 | 7/62 | Mathues et al. | 180—90 |

FOREIGN PATENTS

| | | |
|---|---|---|
| 588,767 | 12/59 | Canada. |
| 882,167 | 11/61 | Great Britain. |

BENJAMIN HERSH, *Primary Examiner.*

LEO FRIAGLIA, A. HARRY LEVY, *Examiners.*

UNITED STATES PATENT OFFICE
CERTIFICATE OF CORRECTION

Patent No. 3,198,543　　　　　　　　　　　　　　August 3, 1965

Peter Presunka

It is hereby certified that error appears in the above numbered patent requiring correction and that the said Letters Patent should read as corrected below.

In the grant, line 2, for "assignor to Steve Presunka, of Ottawa, Ontario, Canada," read -- assignor of one-third to Steve Presunka, of Ottawa, Ontario, Canada, --; line 11, for "Steve Presunka, his heirs" read -- Peter Presunka and Steve Presunka, their heirs --; in the heading to the printed specification, lines 3 and 4, for "assignor to Steve Presunka, Ottawa, Ontario, Canada" read -- assignor of one-third to Steve Presunka, Ottawa, Ontario, Canada --.

Signed and sealed this 22nd day of February 1966.

(SEAL)
Attest:

ERNEST W. SWIDER
Attesting Officer

EDWARD J. BRENNER
Commissioner of Patents